United States Patent
James

(10) Patent No.: US 7,347,425 B2
(45) Date of Patent: Mar. 25, 2008

(54) ROPE SEAL FOR GAS TURBINE ENGINES

(75) Inventor: Terence John James, Market Harborough (GB)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/205,737

(22) Filed: Aug. 17, 2005

(65) Prior Publication Data

US 2006/0038358 A1    Feb. 23, 2006

(30) Foreign Application Priority Data

Aug. 23, 2004 (GB) ................. 0418741.5

(51) Int. Cl.
*F16J 15/02* (2006.01)

(52) U.S. Cl. .................. 277/644; 277/650; 415/173.3; 415/231

(58) Field of Classification Search ........ 277/608–609, 277/616, 637, 650, 644; 415/135, 173.3, 415/174.2, 174–3, 214.1, 231

See application file for complete search history.

(56) References Cited

U.S. PATENT DOCUMENTS

| 4,500,098 | A | | 2/1985 | Wilcox et al. |
| 4,917,302 | A | * | 4/1990 | Steinetz et al. ........ 239/265.11 |
| 5,014,917 | A | * | 5/1991 | Sirocky et al. ........ 239/265.11 |
| 5,188,506 | A | | 2/1993 | Creevy et al. |
| 5,301,595 | A | | 4/1994 | Kessie |
| 7,040,857 | B2 | * | 5/2006 | Chiu et al. .................... 415/1 |
| 7,090,459 | B2 | * | 8/2006 | Bhate et al. .................. 415/1 |
| 2005/0073114 | A1 | * | 4/2005 | Amos et al. ................ 277/644 |

\* cited by examiner

*Primary Examiner*—Vishal Patel
(74) *Attorney, Agent, or Firm*—Kirschstein, et al.

(57) ABSTRACT

A sealing arrangement in a gas turbine engine comprises a rope seal held against a sealing surface by a resilient seal carrier in which the rope seal lies.

5 Claims, 1 Drawing Sheet

ROPE SEAL FOR GAS TURBINE ENGINES

FIELD OF THE INVENTION

The present invention relates to rope seals, such as are used between hot components in heavy-duty gas turbine engines.

BACKGROUND OF THE INVENTION

In the construction of gas turbine engines, it is often necessary to create a seal between adjacent hardware components to prevent, or at least control, leakage of fluids between the components.

FIG. 1 illustrates a location in a gas turbine engine, in which a known type of rope seal arrangement 10 is used to seal the gap G between two adjacent components 12 and 14. Components 12 and 14 may be, for example, parts of a combustor, gap G being necessary to allow movement of component 12 relative to component 14 in the directions indicated by the arrows D. Such movements are due to differential thermal expansion and contraction of the components 12 and 14 and other components of the combustor, or other engine structure, to which the components are fixed. Another cause of such movements may be pressure differences or thrusts on the components due to the combustion reaction in the combustor. As will be realized by the skilled person, it is important to prevent high-pressure gases 16 from leaking excessively through the gap G past the seal 10. This is a particularly difficult task, due to the above-mentioned high temperatures, movements and pressure differentials, but rope-type seals are considered in the heavy-duty gas turbine industry to be a cost-effective means of preventing, or at least minimizing, such leakage.

However, problems arise in that rope seals tend to permanently deform under load at high temperatures and therefore, after the load is removed, do not return to their original dimensions.

To explain further, the rope seal arrangement 10 comprises a length of so-called "rope" 18 housed in a recess 20 in component 14 and of sufficient diameter so that part of its circumference projects out of the recess and stands proud of the outer surface 21 of the component. The rope 18 is typically of woven or plaited construction and comprises refractory ceramic fibers and/or metallic wires. The components 12 and 14 are assembled into the combustor so that in the cold condition the rope 18 is compressed against the surface 22 of component 12. However, when the combustor heats up in use, the components 12 and 14 move with respect to each other and the width of gap G varies, causing the rope to be either further compressed, if the gap reduces, or released somewhat from compression if the gap increases. In case of further compression, although the rope has a certain amount of inherent resilience, this is reduced at high temperatures and the crushing forces caused by the reduction of gap G may exceed the limit of the inherent resilience, so that the rope is liable to become permanently deformed. Hence, next time the combustor is started from cold, there may be a gap between the sealing rope 18 and the surface 22 of component 12. In case of release from compression, high pressure differences between the two sides of the seal may also cause the sealing rope to lift away from its seating in the recess of component 14. Furthermore, with a small diameter rope and/or a shallow recess, there could also be a danger of the seal being blown out of the seating and through the gap G in the direction of the lower pressure.

SUMMARY OF THE INVENTION

The present invention contributes to solving the above problems by energizing the rope seal so that no matter whether the gap G increases or decreases, the rope's sealing surface is nevertheless returned to a good sealing position relative to the component it is sealing against. This can be achieved by holding the rope's sealing surface against a sealing surface of the component by means of a resilient seal carrier in which the rope seal element lies.

In accordance with this concept, a seal arrangement in a gas turbine engine, comprises:

first and second adjacent components of the engine that define a gap therebetween, the gap being variable during operation of the gas turbine engine, and a rope-type seal element comprising a high-temperature resistant ceramic and/or metallic material, wherein the rope seal element is located in a resilient metallic seal carrier that extends lengthways of the rope seal element such that the rope seal element is trapped between the seal carrier and a surface of the first component thereby to seal against the surface, the seal carrier being sealingly located in the second component and resilient at the operating temperatures of the gas turbine engine to urge the rope seal element against the surface.

The rope seal carrier preferably comprises a concave channel and may be supported from the second component by means of resilient supports. The whole carrier may be formed, e.g., by rolling, from a strip of sheet metal.

For sealing an annular gap, the rope seal carrier will be an annular structure and in this case is preferably segmented, since otherwise its curvature could render it excessively stiff.

Further aspects of the invention will be apparent from a perusal of the following description and claims.

BRIEF DESCRIPTION OF THE DRAWINGS

An exemplary embodiment of the invention will now be described, with reference to the accompanying drawings, in which.

DETAILED DESCRIPTION OF A PREFERRED EMBODIMENT

Figure 1:
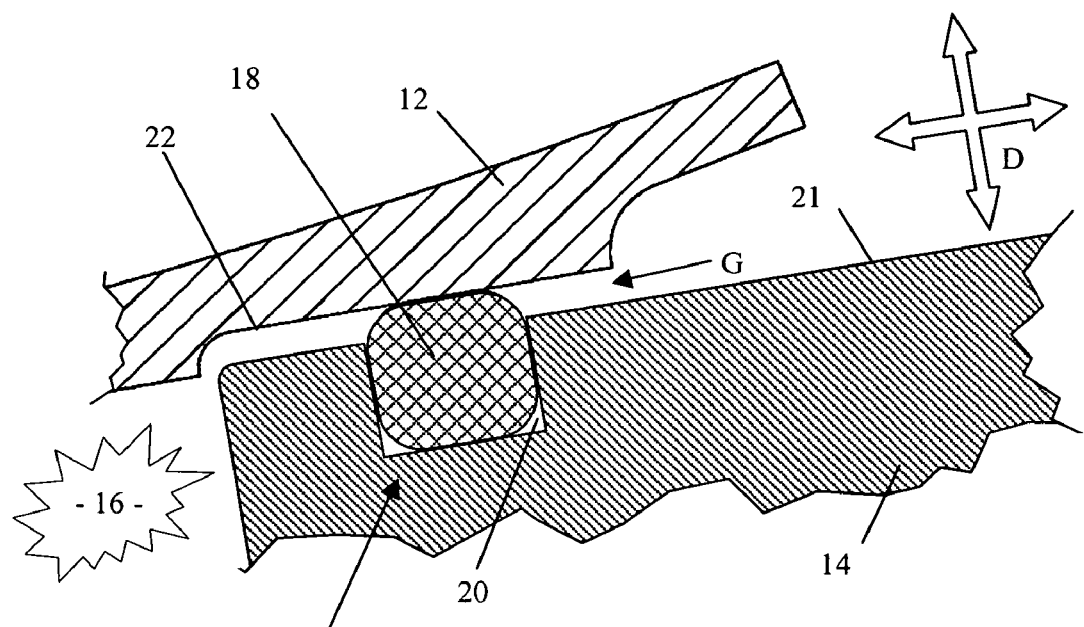
FIG. 1 is a sectional elevation of part of a prior art sealing arrangement in a gas turbine engine employing a high temperature resistant rope seal.
Figure 2:
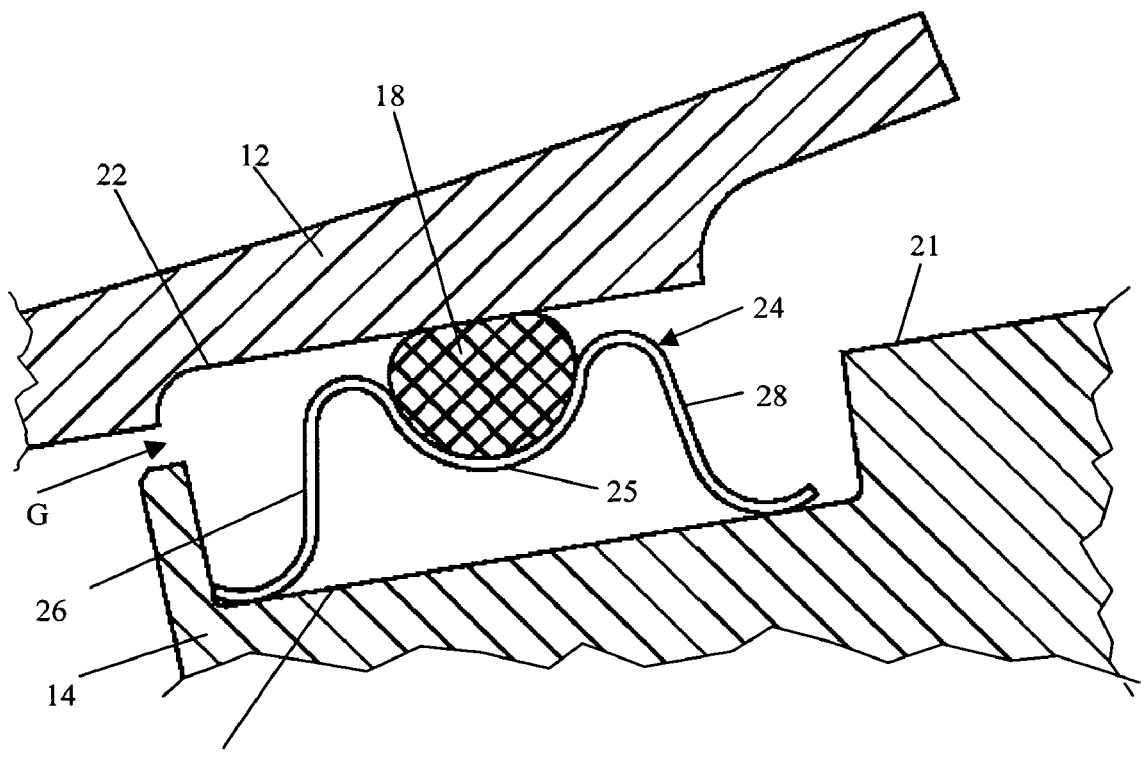
FIG. 2 is a view similar to FIG. 1, but illustrating a sealing arrangement in accordance with the present invention.

FIG. 2 is a view on a radial section in an axial plane through part of a large industrial gas turbine and shows a portion of a combustion liner 12 having an inner surface 22 which confronts an adjacent combustion burner front plate 14. These confronting components define a gap G between them, the gap being variable during operation of the gas turbine engine, due to differential expansion and contraction as the combustor temperature varies from cold to very hot and back to cold again. Additionally, there is a limited amount of relative sliding movement between the components.

A sealing arrangement between liner 12 and plate 14 comprises a rope-like seal 18 composed of a high-temperature resistant ceramic and/or metallic material, and a resilient metallic rope seal carrier 24 extending lengthways of the rope seal and in which the rope seal is located, the rope seal carrier being in turn sealingly located in the confronting face of the plate 14. The rope seal 18, which may advantageously comprise a silicon fiber core and a refractory metal outer braid, is trapped between the rope seal carrier 24 and the surface 22 of the liner 12. The rope seal carrier is resilient at the operating temperatures of the gas turbine engine, so that upon assembly of the combustor, both the rope seal and the rope carrier are compressed. In this way, even when the gap G reduces so much that the rope seal itself becomes permanently deformed and compressed, and the gap subsequently widens beyond the inherent ability of the rope seal to spring back, the rope seal carrier 24 is still operative to urge the rope seal against the surface 22, thereby to seal against it.

The rope seal carrier 24 may be rolled from a strip of resilient thin sheet metal, and for its duty in the combustion section of a gas turbine engine this may be, for example, one of the nickel-based superalloys, such as Haynes 25 or Hastelloy 'X'. When seen in the sectional view of FIG. 2, the carrier 24 exhibits a concave channel 25, in which the rope seal 18 lies, and widely splayed "legs" 26, 28 which contribute to its inherent springiness and give the carrier a generally "lazy M"-shaped section. The legs 26, 28 extend into and are sealing located within a recess 30 in burner plate 14. Upon assembly of the combustor, the recess 30 is wider than the splay of the legs, so that there is sufficient room for further splaying of the legs as the gap G decreases.

As will be understood by the person skilled in the gas turbine art, the combustor components partially illustrated in FIG. 2 have annular cross sections. Hence, the gap G and the recess 30 are annular (or, strictly speaking, describe the frustum of a cone). For sealing such an annular gap, the rope seal carrier is preferably segmented, since otherwise its complex curvature could render it excessively stiff.

I claim:

1. A seal assembly in a region of a gas turbine engine subject to high operating temperatures, comprising:

first and second engine components defining first and second mutually confronting surfaces that define a gap therebetween, the gap being variable during operation of the gas turbine engine, a recess in the second surface, the recess having a rear surface that faces toward the first surface, a rope seal element comprising a high-temperature resistant material of at least one of ceramic and metal, and a resilient seal carrier extending lengthways of the rope seal element and in which the rope seal element is located, the rope seal element being trapped between the seal carrier and the first surface to seal against the first surface, the seal carrier being resilient at the operating temperatures of the gas turbine engine to urge the rope seal element against the first surface, the seal carrier having splayed leg portions that seal against the rear surface of the recess, the recess being substantially wider than the splay of the splayed leg portions upon assembly of the first and second components into the engine, and the splayed leg portions being operative to splay further apart on the rear surface of the recess as the gap between the first and second mutually confronting surfaces decreases.

2. The sealing arrangement of claim 1, in which the seal carrier comprises a concave channel.

3. The sealing arrangement of claim 1, in which the seal carrier comprises sheet metal.

4. The sealing arrangement of claim 3, in which the seal carrier is roll-formed.

5. The sealing arrangement of claim 1, in which the gap is annular and the seal carrier is a segmented annular structure.

* * * * *